May 7, 1929.  L. O. McLEAN  1,711,896

CONTROL MECHANISM FOR POWER SHOVELS, HOISTS, CRANES, AND THE LIKE

Filed Dec. 24, 1925

WITNESSES
J. Herbert Bradley

INVENTOR
Leland O. McLean,
by Edward A. Lawrence
his attorney.

Patented May 7, 1929.

1,711,896

UNITED STATES PATENT OFFICE.

LELAND O. McLEAN, OF PITTSBURGH, PENNSYLVANIA.

CONTROL MECHANISM FOR POWER SHOVELS, HOISTS, CRANES, AND THE LIKE.

Application filed December 24, 1925. Serial No. 77,640.

According to the present practice three or more operating levers are required and in addition a hand-rope is generally employed to trip the bucket of a power-shovel. Consequently the operator must possess a high degree of skill and agility to operate the machine and its operation at best is usually so jerky and lacking in smoothness as to cause excess wear and tear on the equipment. Furthermore accidents to the equipment and personnel frequently occur because the operator necessarily divides his attention between a plurality of operations occurring simultaneously.

The object which I have in view is the simplification of the control operations and the control mechanism.

In my invention but two control levers are employed, one of which is grasped by either hand, and all of the control operations are performed by these levers.

I have also provided new and improved lever mechanism for the purposes in view.

Other novel features of construction and also arrangement of parts will appear from the following description.

Figure 1:
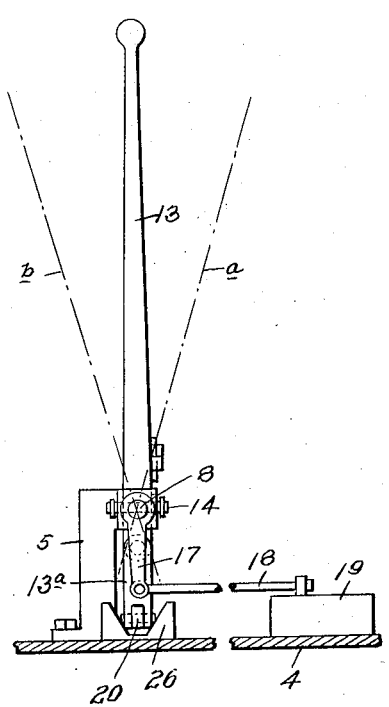
Figure 2:
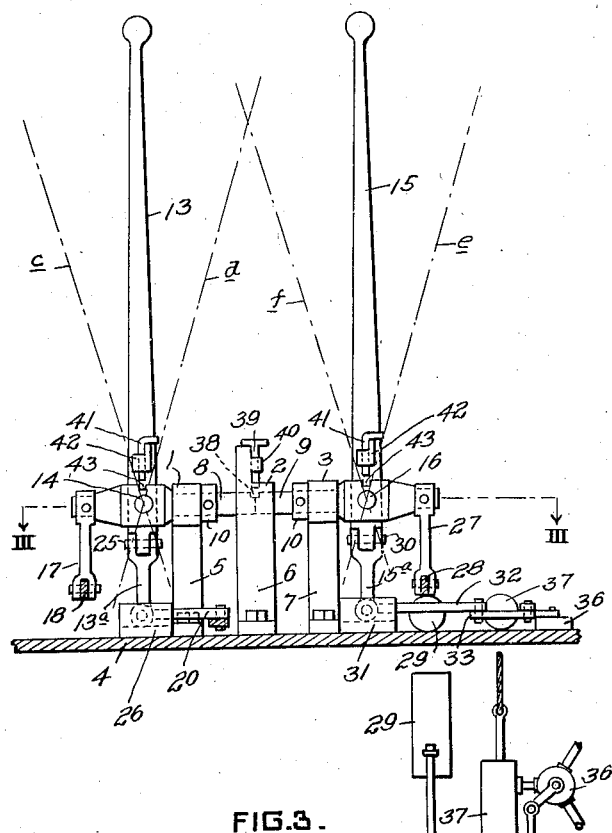
Figure 3:
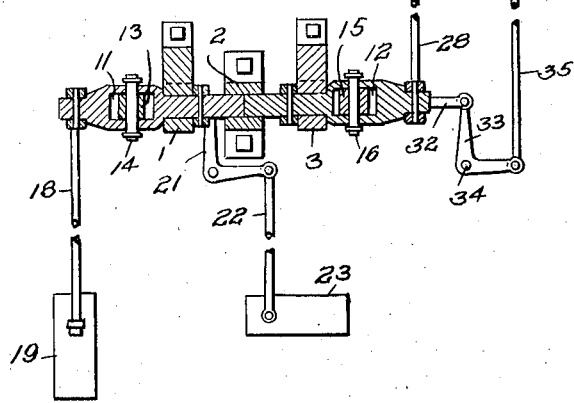

In the accompanying drawings, wherein I have illustrated the best embodiment of the principles of my invention now known to me, Fig. 1 is a side elevation illustrating the application of my invention to the control mechanism of a power-shovel; Fig. 2 is a rear elevation of the same, and Fig. 3 is a view in horizontal section taken along the line III—III in Fig. 2.

Referring to the drawings, 1, 2 and 3 represent three horizontally alined sleeve bearings, which may be and preferably are supported above the floor 4 of the cab of the shovel on stands 5, 6 and 7, respectively.

8 and 9 represent a pair of alined shafts having their adjacent ends journaled in the control bearing 2 and extending through the bearings 1 and 3, respectively. An inward movement of the shafts is prevented by the enlargements of their outer ends while their outward movement is prevented by the collars 10 pinned on the shafts at the inner sides of the bearings 1 and 3, respectively. Thus the shafts are capable of rotary movements only, and such movements are independent of each other.

Outside of the bearing 1, the shaft 8 is provided with a diametric opening 11 which is elongated longitudinally of the shaft and the outer end of the shaft 9 is provided with a similar opening 12.

13 is a hand-lever having its lower end inserted through the opening 11 in the shaft 8 and pivotally connected to said shaft as by the pin 14 extending diametrically of the shaft, whereby the shaft may be rotated by swinging the lever in a plane at right angles to the axis of the shaft but the lever may also be swung in the plane of the axis of the shaft without moving the shaft.

Similarly a second hand-lever 15 is pivotally mounted on the cross pin 16 in the opening 12 in the outer end of the shaft 9, thus enabling the shaft 9 to be rotated by swinging the lever at right angles to the axis of the shaft and the lever to be also swung in the plane of the axis of the shaft without moving the shaft 9.

The various control operations are arranged to be accomplished by these different movements of the levers.

Thus to the outer end of the shaft 8 I pin or otherwise attach the crank-arm 17 from whose outer end a link 18 extends to the hoisting engine indicated at 19 in Figs. 1 and 3.

The lower end of the lever 13 is connected by a link 20 with one arm of a bell-crank-lever 21, having its axis pivoted to a fixed point, and having its other arm connected by a link 22 with the engine for swinging the boom or bucket, indicated at 23 in Fig. 3.

It is thus evident that by swinging the lever 13 in a plane at right angles to the shaft 8, the shaft will be rotated to control the operation of the hoisting engine. It is further evident that by swinging the lever in the plane of the axis of the shaft the boom or bucket will be swung. It is further evident that the accomplishment of one of said control operations does not affect the control operation which is to be accomplished by the other movement of the lever.

Where the link connection at the foot of the lever is short, as in the case of the link 20, the other movement of the lever might cause the bell-crank lever to be moved and thus accidentally cause a control change in the swinging engine. To avoid this I form the foot of the lever 13 of a separate piece or link 13ª hinged to the lever proper, as at 25 on an axis parallel to that of the shaft 8, so that when the shaft 8 is rotated by the proper movement of the lever 13, the foot-member or link 13ª of the lever 13 will yield and thus prevent material or effective movement of the link 20 or the bell-crank-lever 21. To absolutely prevent the foot-member or link 13ª from swinging with the lever when the shaft is rotated, I provide means engaging said foot-member and preventing any motion thereof except in the plane of the axis of the shaft 8. Thus I may provide a metal trough-block 26 which may be attached to the floor 4, and in which the lower end of the foot-member or link 13ª is contained, the trough-groove extending parallel with the shaft 8. It is evident that the lower end of the foot-member or link 13ª is thus prevented from rotary movement with the shaft 8 but is free to move with the lever 13 on the plane of the axis of the shaft 8.

Likewise the outer end of the shaft 9 has pinned or otherwise secured, thereon the crank arm 27 which is connected by a link 28 with the engine 29 which accomplishes the crowding movement of the bucket. Also the foot-member or link 15ª of the lever 15 which is pivotally attached to said lever on an axis 30 parallel to the shaft 9 and which is prevented from rotary movement with the shaft by the trough block 31 in which the lower end of the foot-member or link 15ª is engaged, is connected by a link 32 with an arm of a bell-crank-lever 33 pivoted to a fixed point 34 and having its other arm connected by a link 35 with the valve 36 of the engine 37 which operates the bucket-bottom latch.

In the arrangement indicated in the drawings, the lever 13 is moved from its vertical position to the position indicated by the dotted line $a$ in Fig. 1 to disengage the clutch. Its movement from $a$ to vertical engages the clutch and its movement from vertical to the position indicated by the dotted line $b$ in Fig. 1 increases the power while a reverse movement decreases the power.

Again the movement of the lever 13 from the vertical to the position indicated by the dotted line $c$ in Fig. 2 actuates the swinging engine to swing the boom or bucket in one direction while a movement of the lever from the vertical to the position indicated by the dotted line $d$ in Fig. 2 actuates the swinging engine to swing the bucket in the reverse direction. A return of the lever 15 to the vertical stops the swinging movement of the bucket.

In the case of the lever 15, a swing of the same from the vertical to the position indicated by the dotted line $e$ releases the latch and causes the bottom of the bucket to drop. The bottom closes by gravity when the bucket resumes its digging position and automatically locks closed. The movement of the lever 15 to the left in Fig. 2 into the position shown by dotted line $f$ may be used for the control of any other operation, such as blowing the whistle.

The movement of the lever 15 in one direction in a plane at right angles to the axis of the shaft 9 crowds the bucket and a reverse movement reverses the movement of the bucket.

The stands 5, 6 and 7 are stepped forward from the vertical plane of the shafts 8 and 9 so as to provide clearance for connections of the lower ends of the lever, and the bearings 1, 2 and 3 extend rearwardly from the stands.

The shafts 8 and 9 are provided with seats 38 which may be engaged by a locking pin 39 slidably mounted in a vertically disposed sleeve 40 integral with the central bearing 2 and working through a hole in the top wall of said bearing. The seats 38 are located so that they register with the hole in the bearing when neutral. Thus the shafts may be locked in neutral against accidental rotation.

The levers 13 and 15 are similarly provided with pins 41 slidable in vertical sleeves 42 carried by the levers, which pins may be depressed into seats 43 in the shafts when the levers are at neutral, thereby locking the levers in neutral position.

My improved control mechanism may be made up as a unitary structure, as illustrated in the drawings, so that it may be conveniently installed on machines now in use at small expense. The expense of such installation is relatively slight.

In the drawings I have shown the connections above the floor but it is evident that if desired, the same may be placed beneath the floor of the cab.

By the use of my invention the work of operating machines of the general class referred to is made much easier and much safer, as the operator has only two levers to operate and maintains hold on the same, and is thus better enabled to give constant and efficient attention to his duties. The motions are natural motions of the arms, and therefore soon become intuitive.

What I desire to claim is:—

1. A hand lever control device for the purpose described comprising a shaft journaled for rotation on its longitudinal axis, a hand lever pivotally mounted intermediate of its ends on said shaft in such manner as to rotate said shaft when said lever is swung in a plane angular to the axis of said shaft and to move independently of said shaft when said lever is swung in the plane of the axis of the shaft, control mechanism connected to said shaft and actuated by its rotation, other control mechanism connected to the lower end of the lever and actuated by the independent movement of said lever, and a flexible joint in the lower end of said lever whereby the rotation of said shaft is prevented from affecting the second mentioned control means.

2. A hand lever control device for the purpose described comprising a shaft journaled for rotation on its longitudinal axis, a hand lever pivotally mounted on said shaft in such manner as to move with said shaft when said lever is swung on a plane angular to the axis of said shaft and to move independently of said shaft when said lever is moved in the plane of said shaft, control mechanism operatively connected to said shaft to be actuated by the rotation of said shaft, second control mechanism, and a link connecting said second control mechanism with the hand lever, one end of said link being pivotally connected to the hand lever to swing relatively thereto on an axis parallel to the longitudinal axis of said shaft and the other end of said link being pivotally connected to the control mechanism on an axis at right angles to the longitudinal axis of said shaft.

Signed at Pittsburgh, Pa., this 21st day of December, 1925.

LELAND O. McLEAN.